United States Patent
Jennen et al.

(10) Patent No.: US 7,386,235 B2
(45) Date of Patent: Jun. 10, 2008

(54) PROTOCOL AND LINE-RATE TRANSPARENT WDM PASSIVE OPTICAL NETWORK

(75) Inventors: Jean G. Jennen, Huizen (NL); Robert Smets, Weesp (NL)

(73) Assignee: Lucent Technologies Inc., Murray Hill, NJ (US)

( * ) Notice: Subject to any disclaimer, the term of this patent is extended or adjusted under 35 U.S.C. 154(b) by 619 days.

(21) Appl. No.: 10/878,462

(22) Filed: Jun. 28, 2004

(65) Prior Publication Data

US 2005/0286903 A1    Dec. 29, 2005

(51) Int. Cl.
*H04J 14/00* (2006.01)
*H04B 10/00* (2006.01)

(52) U.S. Cl. .................................. 398/72; 398/170
(58) Field of Classification Search ............ 398/63, 398/68, 70–72, 170
See application file for complete search history.

(56) References Cited

U.S. PATENT DOCUMENTS

| | | | |
|---|---|---|---|
| 5,699,176 A | | 12/1997 | Cohen |
| 5,880,865 A | | 3/1999 | Lu et al. |
| 6,304,350 B1 | | 10/2001 | Doerr et al. |
| 2002/0145780 A1 | | 10/2002 | Frigo et al. |
| 2002/0186439 A1 | | 12/2002 | Buabbud et al. |
| 2002/0196491 A1 | | 12/2002 | Deng et al. |
| 2003/0118280 A1 | | 6/2003 | Miyazaki et al. |
| 2004/0208233 A1* | | 10/2004 | Dafesh ............... 375/147 |
| 2005/0074240 A1* | | 4/2005 | Jung et al. ............ 398/72 |
| 2005/0163147 A1* | | 7/2005 | Buabbud et al. ...... 370/436 |
| 2005/0163503 A1* | | 7/2005 | Lee et al. ............. 398/19 |
| 2005/0226640 A1* | | 10/2005 | Audic et al. .......... 398/202 |

FOREIGN PATENT DOCUMENTS

| | | |
|---|---|---|
| EP | 0 685 948 A1 | 12/1995 |
| EP | 1 418 691 A2 | 5/2004 |
| GB | 2 181 921 A | 4/1987 |
| WO | WO 00/74278 A1 | 12/2000 |
| WO | WO 03/010904 A2 | 2/2003 |

OTHER PUBLICATIONS

Nicholson G, "Use of a Fibre Loop Reflector as Downstream Receiver and Upstream Modulator in Passive Optical Network", Electronics Letters, Jun. 7, 1990, vol. 26, No. 12, pp. 827-828, Stevenage, Herts., GB.

(Continued)

*Primary Examiner*—Jason Chan
*Assistant Examiner*—Nathan Curs

(57) ABSTRACT

The present invention provides a method, apparatus and system for a protocol and line-rate transparent WDM passive optical network architecture that scales in terms of bandwidth and number of ONUs. Both an included optical line terminal and each of a plurality of ONUs use substantially the same reflective modulators to modulate respective wavelength channels to impart data thereto. In various embodiments of the present invention, the reflective modulators are composed of a SOA having on one facet a pigtailed fiber and the other facet coated with a highly reflective coating. In the WDM passive optical network of the present invention, the ONUs each comprises a separate wavelength for communication in the upstream and the downstream directions. The present invention allows for all-passive components to be placed in the field, thus, requiring no power between a central office and a user or subscriber's premises.

13 Claims, 7 Drawing Sheets

OTHER PUBLICATIONS

Cheng, Steven S. et al., "A Distributed Star Network Architecture for Interoffice Applications", Journal of Lightwave Technology, vol. LT-4, No. 7, Jul. 1986, pp. 755-758.

European Search Report, European Application No. 04253858.7, Dec. 8, 2004.

* cited by examiner

PROTOCOL AND LINE-RATE TRANSPARENT WDM PASSIVE OPTICAL NETWORK

FIELD OF THE INVENTION

This invention relates generally to the delivery of communication services to subscribers via a communication network and, more specifically, to the transmission of optical signals to individual subscribers or groups of subscribers over a protocol and line-rate transparent WDM passive optical network.

BACKGROUND OF THE INVENTION

Fiber-to-the-home broadband-access is becoming increasingly popular. Such high capacity communication links provide broadband transmission access capable of reaching all the way to the individual subscribers of a communication network. Known technologies and techniques like classic passive optical networks are standardized in full-service access networks (FSAN). However cost issues do not allow for a large-scale deployment.

Different architectures employ point-to-point transmission and perform opto-electronic conversions to aggregate traffic where electro-optic conversion takes place to transmit to the next point of aggregation in the network. Such techniques, however, require in field power resources. To this point, it has been shown difficult to realize a proper physical layer solution for a low cost fiber-optic access network. Current solutions fall short because they are protocol sensitive, require expensive opto-electronic components and do not scale.

SUMMARY OF THE INVENTION

The present invention addresses various deficiencies of the prior art by providing a method, apparatus and system for a protocol and line-rate transparent WDM passive optical network architecture that scales in terms of bandwidth and number of optical network units (ONUs). The invention uses substantially the same reflective modulators both at the optical line terminal (OLT) and ONU sides to eliminate costly distributed feedback (DFB) laser diodes at the ONUs. Instead a single dual-output multiple-frequency laser source is located at the OLT side. In addition, due to the fact that both the OLT and the ONU of a WDM PON in accordance with the present invention have substantially the same reflective modulators and use substantially the same laser source, there exists a level of symmetry in the architecture. The ONUs of the protocol and line-rate transparent WDM passive optical network of the present invention each comprises a separate wavelength for communication.

In one embodiment of the present invention, a method includes receiving, via a downstream communications path in a WDM passive optical network, a first wavelength channel having downstream data imparted thereto and a second wavelength channel intended for use in upstream communication. The method further includes modulating the received second wavelength channel using a reflective modulator to impart upstream data thereto and propagating the modulated second wavelength channel towards an upstream receiver.

In an alternate embodiment of the present invention an optical network unit includes a receiver adapted to receive a respective wavelength channel from an upstream source and a transmitter including a reflective modulator. The transmitter of the optical network unit of the present invention is adapted to impart data onto the received wavelength channel and to transmit the data-imparted wavelength channel upstream via the reflective modulator.

In an alternate embodiment of the present invention, a protocol and line-rate transparent WDM passive optical network includes an optical line terminal for providing upstream and downstream wavelength channels. The optical line terminal includes a plurality of reflective modulators for modulating respective downstream wavelength channels to impart downstream data thereto wherein the upstream wavelength channels and the modulated downstream wavelength channels are propagated in a downstream direction toward a respective optical network unit and only distinct upstream and downstream wavelength channels are provided for each optical network unit. The WDM passive optical network further includes an optical feeder network including a passive optical demultiplexer for directing each of the upstream and downstream wavelength channels to a respective intended optical network unit. In the WDM passive optical network a plurality of optical network units each include a receiver for receiving a respective downstream wavelength channel and a reflective modulator for modulating a respective upstream wavelength channel to impart upstream data thereto. The respective reflective modulators of each of the receivers are also implemented for reflecting the respectively modulated upstream wavelength channels in an upstream direction toward a respective upstream receiver.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a protocol and line-rate transparent WDM passive optical network (PON) architecture that scales in terms of bandwidth and number of ONUs. Both OLT and ONUs use reflective modulators to transmit any data. In various embodiments of the present invention, the reflective modulators are composed of a SOA having on one facet a pigtailed optical fiber and the other facet coated with a highly reflective coating. The ONUs of the protocol and line-rate transparent WDM PON each comprises a separate wavelength for communication. Although various embodiments of the present invention are described herein with respect to a protocol and line-rate transparent WDM passive optical network communicating via specific, illustrative protocols and using a specific number of wavelength channels, the specific embodiments of the present invention should not be treated as limiting the scope of the invention. It will be appreciated by those skilled in the art and informed by the teachings of the present invention that a protocol and line-rate transparent WDM passive optical network in accordance with the present invention may be advantageously implemented using substantially any communications protocol and substantially any number of wavelength channels.

Figure 1:
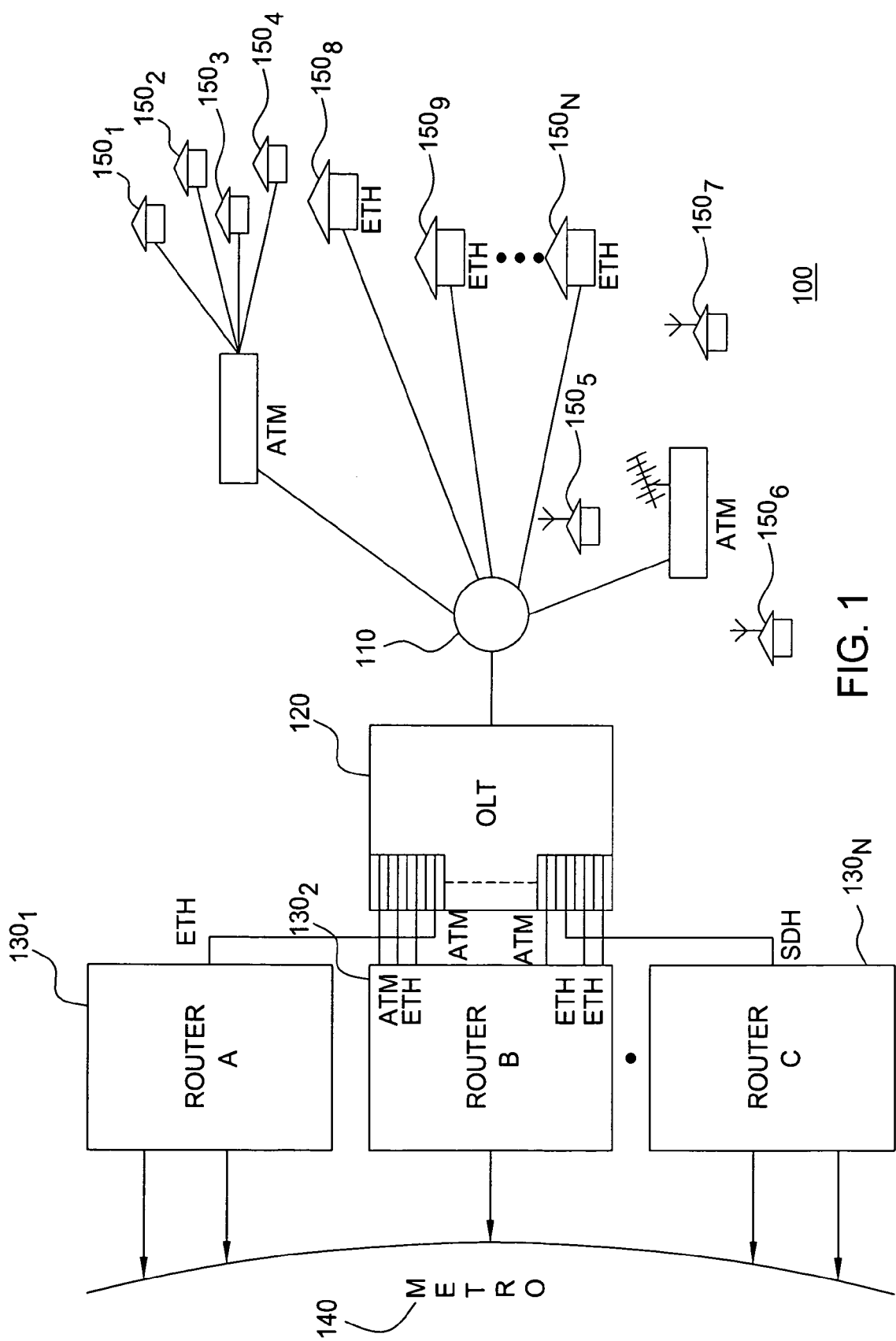
FIG. 1 depicts a high level block diagram of an embodiment of a protocol and line-rate transparent WDM PON in accordance with the present invention.

FIG. 1 depicts a high level block diagram of an embodiment of a protocol and line-rate transparent WDM passive optical network (PON) in accordance with the present invention. The WDM PON 100 of FIG. 1 comprises a central office 110, an optical line terminal (OLT) 120, a plurality of routers $130_1$-$130_N$ (collectively routers 130), an arbitrary metropolitan area network 140, and a plurality of optical network units (ONUs) $150_1$-$150_N$ (collectively ONUs 150). The routers 130 are equipped with SDH, ATM, Ethernet line cards or line cards of any such protocol that an ONU 150 may be implementing. As such, for each ONU 150 a unique protocol may be selected. However, if a particular ONU uses a particular protocol then, at the OLT 120, a corresponding physical interface must also support that protocol. In the WDM PON 100 of FIG. 1, each ONU 150 operates using a separate wavelength. This allows for a fully isolated and secure ONU 150. The architecture of the present invention allows for passive components to be placed in the field. As such, no power is needed between the central office 110, which functions as the local splitting center and often contains the OLT 120, and a user's premises (ONU).

An optical layer of a WDM PON in accordance with the present invention allows for flexible placement of the ONUs 150 at a user's premises or in the field at points wherever electrical power is available. In this particular case, it is also possible to connect an xDSL or other concentrating equipment to a subject ONU 150. Such an arrangement enables a number of potential last meter technologies to profit from a transparent feeder network of the present invention.

Figure 2:
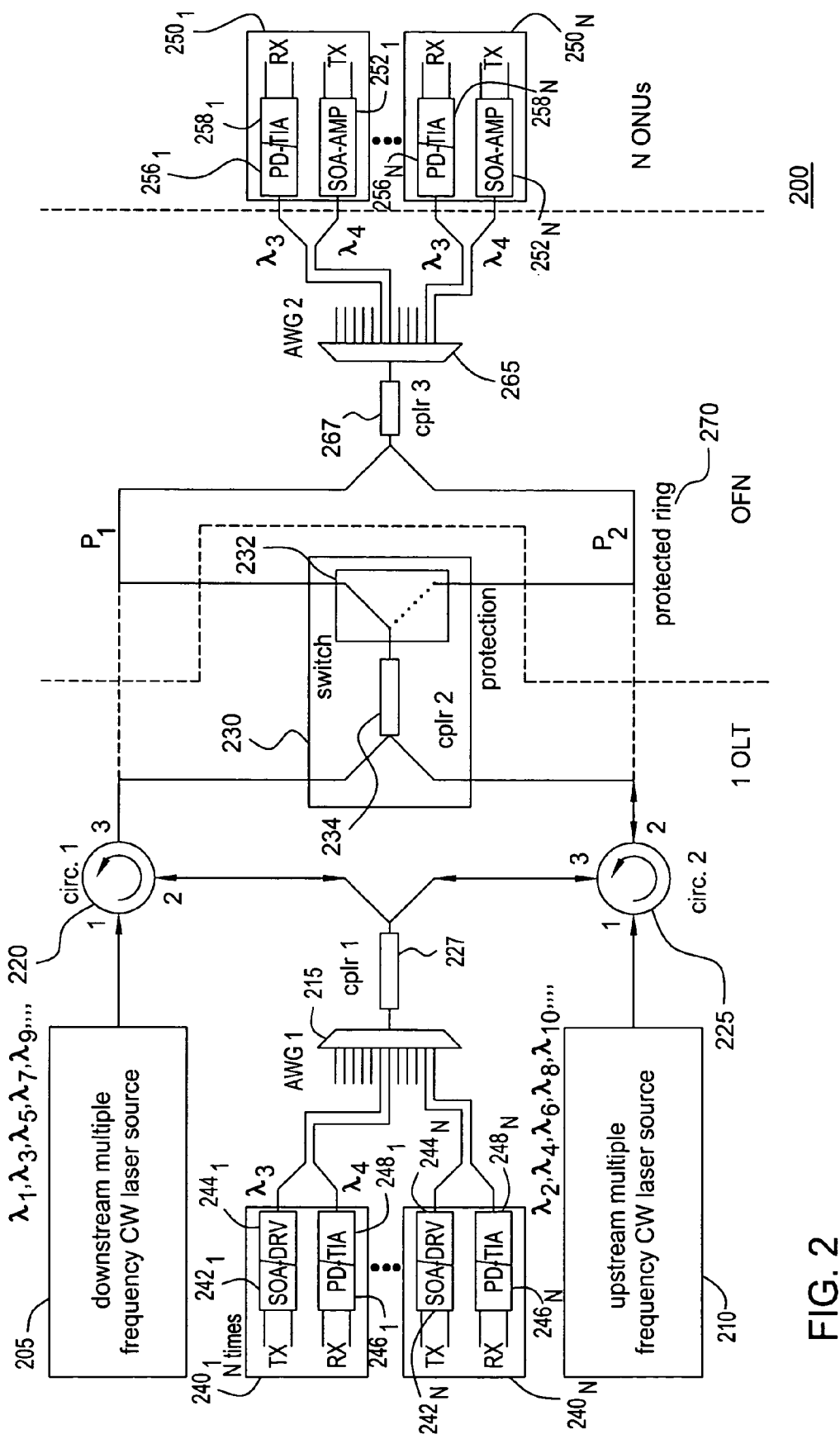
FIG. 2 depicts a high level block diagram of an embodiment of an optical layer architecture of the WDM PON of FIG. 1, with a common OLT and ONU reflective SOA based modulator.

For example, FIG. 2 depicts a high level block diagram of an embodiment of an optical layer architecture of the WDM PON 100 of FIG. 1. The optical layer architecture 200 of FIG. 2 depicts the optical layer of the OLT 120 which connects to N different ONUs 150 via an Optical Feeder Network (OFN) 260. The optical layer of the OLT 120 of FIG. 2 illustratively comprises a downstream multiple frequency CW laser source 205, an upstream multiple frequency CW laser source 210, a first demultiplexer (illustratively a first arrayed waveguide grating (AWG)) 215, a first circulator 220, a second circulator 225, a first optical coupler (illustratively a 3 dB coupler) 227, a switch unit 230 comprising a switch 232 and a second optical coupler 234, and a plurality of transceivers $240_1$-$240_N$ (collectively transceivers 240). Each of the transceivers 240 of the OLT 120 illustratively comprises a transmitter portion comprising a reflective modulator (illustratively a modulating semiconductor optical amplifier (SOA)) 242 and a driver 244, and a receiver portion comprising an electro-optic detector (illustratively a photodiode) 246 and a current-to-voltage amplifier (illustratively a trans-impedance amplifier (TIA)) 248.

The optical layer of each of the ONUs 150 illustratively comprises a transceiver 250. Each of the transceivers 250 of the ONUs 150 illustratively comprises a transmitter portion comprising a reflective modulator (illustratively a modulating semiconductor optical amplifier (SOA)) 252 and a receiver portion comprising an electro-optic detector (illustratively a photodiode) 256 and a current-to-voltage amplifier (illustratively a trans-impedance amplifier (TIA)) 258.

The optical layer of the OFN 260 illustratively comprises a second demultiplexer (illustratively a second AWG) 265, a third optical coupler 267 and a protection ring 270 illustratively comprising two optical paths, P1 and P2. In accordance with the present invention, the SOAs 242, 252 of the transceivers 240 of the OLT 120 and the transceivers 250 of the ONUs 150, respectively, may comprise reflective SOAs including one or more in-line SOA structures integrated on a chip having on one side a pigtailed optical fiber and coated on the other side with a highly reflective coating of, for example, gold or silver. The reflective modulators of the OLT and ONU are of the same technology and are wavelength independent and, therefore very cost effective.

Illustratively, in the optical layer architecture 200 of FIG. 2, the downstream multiple frequency CW laser source 205 generates odd wavelengths for downstream transmission and the upstream multiple frequency CW laser source 210 generates even wavelengths for upstream transmission. For illustrative purposes, the operation of the optical layer architecture 200 of FIG. 2 will be described with reference to the depicted ONU 150 operating via a first wavelength channel, $\lambda_3$, for downstream traffic and a second wavelength channel, $\lambda_4$, for upstream traffic. The downstream CW laser source 205 generates a number of wavelength channels, including wavelength $\lambda_3$. All of the generated wavelength channels enter the first circulator 220 at a first port 1 and exit the first circulator 220 at a second port 2. Via the first coupler 227, the generated wavelength channels are communicated to the first AWG 215 where each wavelength channel is demultiplexed to a different, respective output fiber of the first AWG 215. The demultiplexed wavelength channel, in this case $\lambda_3$, is communicated to a respective one of the plurality of OLT transceivers 240.

In the transceiver 240, the demultiplexed wavelength channel, $\lambda_3$, enters the transmitter portion and is communicated to and amplified by the reflective modulating SOA 242 and is then modulated via the driver 244 with data having a protocol (e.g., Ethernet, ATM, SDH . . . ) consistent with an intended receiving ONU 150. The reflected and amplified wavelength channel, $\lambda_3$, now containing data, is communicated back to the AWG 215 and is forwarded through the first coupler 227 to the second port 2 of the first circulator 220 and also to a third port 3 of the second circulator 225. The portion of the wavelength channel, $\lambda_3$, communicated to the third port 3 of the second circulator 225 is absorbed while the portion of the wavelength channel, $\lambda_3$, that is communicated to the second port 2 of the first circulator 220 is communicated to the switch unit 230 via the third port 3 of circulator 220.

At the switch unit 230, the wavelength channel, $\lambda_3$, is received by the second coupler 234. At the switch unit 230, a choice is made, by positioning the switch 232, to either transmit the received wavelength channel, $\lambda_3$, in the clockwise direction via the first path P1 of the protection ring 270 or the counter clockwise direction via the second path P2 of the protection ring 270. In either case the wavelength channel, $\lambda_3$, is communicated to the third optical coupler 267, which forwards the wavelength channel, $\lambda_3$, to the second AWG 265. At the second AWG 265, the received wavelength channel, $\lambda_3$, is demultiplexed to a different, respective output fiber (port) of the second AWG 265. The demultiplexed wavelength channel, $\lambda_3$, exits the AWG 265 and is communicated to a respective one of the plurality of transceivers 250 of the ONUs 150. At the transceiver 250, the wavelength channel, $\lambda_3$, is detected at the receiver portion by a respective photodiode 256 and is converted to the electrical domain. The data is then amplified by the TIA 258 and is available for further signal processing as an arbitrary protocol prescribes.

In the case of upstream traffic, multiple wavelengths are generated in the upstream source 210 which is also located in the OLT 120. Among these wavelengths is wavelength $\lambda_4$. Wavelength $\lambda_4$ enters a first port 1 of the second circulator 225 and is forwarded to a second port 2 of the second circulator 225. The upstream wavelength channel, $\lambda_4$, is forwarded to the switch unit 230 and is communicated to a location depending on the position of the switch 232 either in the clock wise or counter clockwise direction to the third optical coupler 267 which forwards the wavelength channel, $\lambda_4$, to the second AWG 265. At the second AWG 265, the received wavelength channel, $\lambda_4$, is demultiplexed to a specific, respective output fiber (port) of the second AWG 265. The demultiplexed wavelength channel, $\lambda_4$, exits the AWG 265 and is communicated to a respective one of the plurality of transceivers 250 of the ONUs 150. At the transceiver 250, the wavelength channel, $\lambda_4$, is then communicated to and amplified by the reflective modulating SOA 252 in the transmitter portion of the transceiver 250 of the respective ONU 150. Here upstream Ethernet data or data of any arbitrary protocol is fed into the transmitter portion of the transceiver 250. Data is modulated in the reflective modulating SOA 252 and transmitted back to the second AWG 265. At the third optical coupler 267, the modulated data is split into the two optical paths P1 and P2. The signals in the two optical paths P1 and P2 are directed to the switch and the signal is communicated to the second optical coupler 234 from one of the two optical paths depending on the position of the switch 232. The signal is split by the second optical coupler 234 to port 3 of the first circulator 220 where it is absorbed and to port 2 of the second circulator 225 where it is forwarded to the first coupler 227. The first optical coupler directs the signal to the first AWG 215 where the signal is finally communicated to the receiver portion of the transceiver 240. Because the transmitter portions of the transceivers 240 of the OLT 120 and the transceivers 250 of the ONUs 150 each comprises a reflective modulating SOA, there is no need for a distributed feedback single mode laser diode to be included in each of the ONUs for providing upstream communication channels as in prior art WDM passive optical networks. That is, due to the fact that both the OLT and the ONU of a WDM PON in accordance with the present invention have substantially the same reflective modulators and use substantially the same laser source, there exists a level of symmetry in the architecture of a WDM PON in accordance with the present invention.

Figure 3:
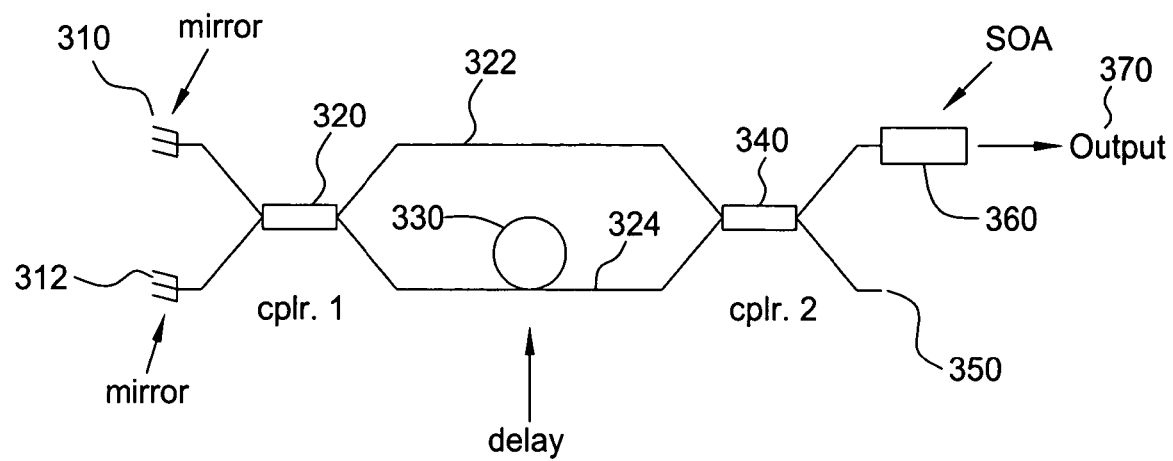
FIG. 3 depicts a high level block diagram of an embodiment of a single-output multiple frequency CW laser source suitable for use as the downstream multiple frequency CW laser source or the upstream multiple frequency CW laser source of the OLT of the optical layer architecture of FIG. 2.

FIG. 3 depicts a high level block diagram of an embodiment of a single-output multiple frequency CW laser source suitable for use as the downstream multiple frequency CW laser source 205 or the upstream multiple frequency CW laser source 210 of the OLT 120 of the optical layer architecture 200 of FIG. 2. The single-output multiple frequency CW laser 300 of FIG. 3 illustratively comprises two reflective devices (illustratively two mirrors) 310, 312, a first optical coupler 320, two optical paths, 322, 324, an optical delay device 330, a second optical coupler 340, a first output 350, a partially reflective SOA 360 (i.e., the right side is reflecting) and a second output 370. In the single-output multiple frequency CW laser 300 of FIG. 3, light that matches the roundtrip oscillating conditions (e.g., a roundtrip gain of 1 and a roundtrip phase shift of m*360 degrees, m being an integer) is partially emitted at the output and partially reflected back into the SOA to the second optical coupler 340. Here the light is split up into the two optical paths, 322, 324. Light in the first optical path 322 is directed to the first optical coupler 320 where it is directed to the mirrors 310 and 312. The light reflected by the mirrors 310 and 312 are directed back toward the partially reflective SOA 360 via the first optical coupler 320 via the two optical paths 322 and 324 (including the delay 330). The components of the light in the two optical paths 322 and 324 (remembering that one of the components has been delayed by the delay device 330) constructively interfere in the second optical coupler 340 for that specific frequency of light. The light is then amplified by the SOA 360 and exit the laser 300 via the second output 370. Frequencies that destructively interfere will not appear at the second output 370 of the laser 300. With the above configuration, a comb of optical frequencies will become available at the second output 370 of the laser 300. The first output port 350 may be used for monitoring purposes.

In the single-output multiple frequency CW laser 300, if the equivalent of the delay is equal to L meters, by taking into account the phase velocity in waveguides the generated frequencies may be characterized according to equation one (1), which follows:

$$f = m\frac{c}{2L}, \quad (1)$$

where m depicts an integer indicating the mode or frequency index and c depicts the speed of light in free space.

Figure 4:
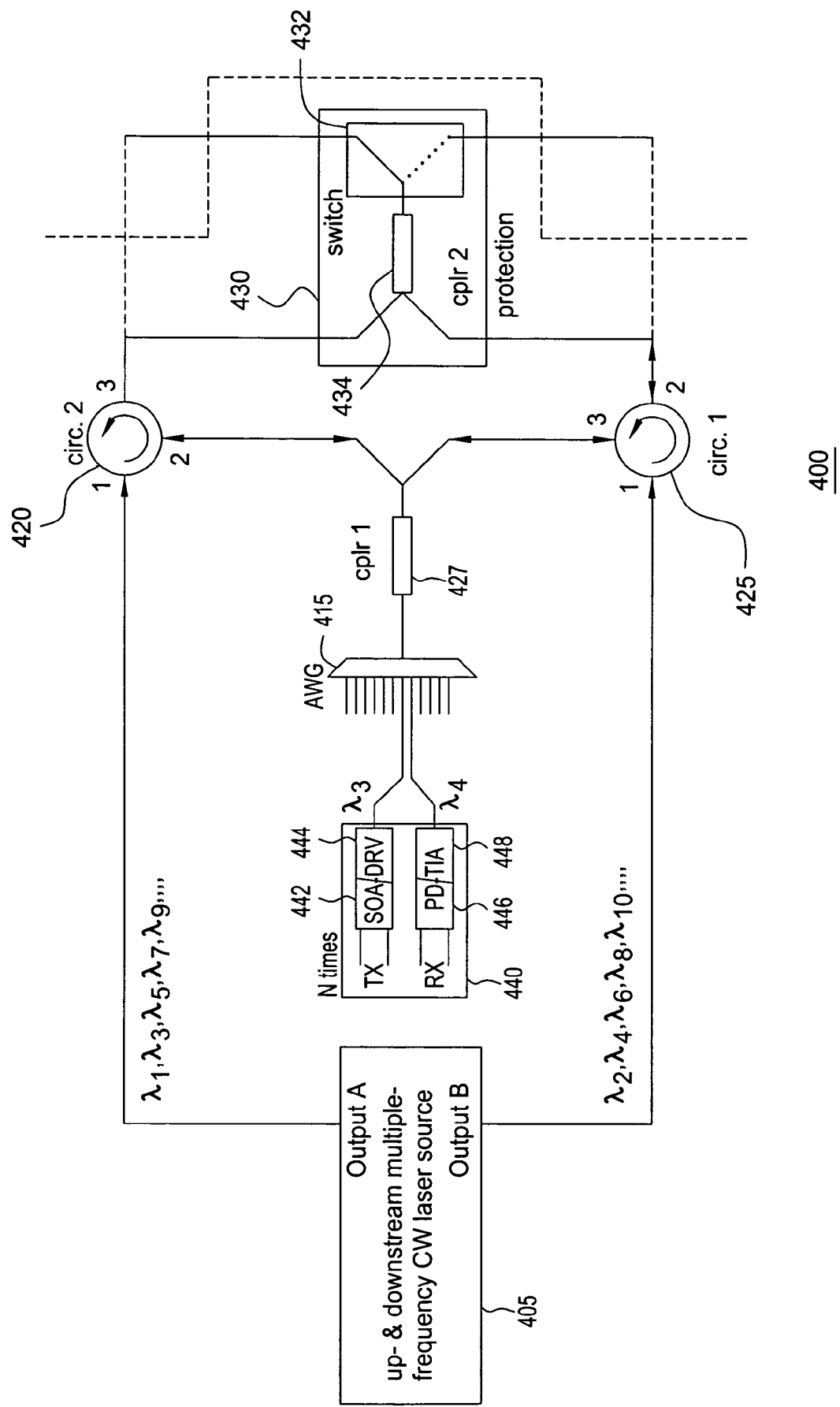
FIG. 4 depicts an alternate embodiment of an optical layer architecture of an OLT in accordance with the present invention, suitable for use in the WDM PON of FIG. 2.

FIG. 4 depicts an alternate embodiment of an optical layer of an OLT in accordance with the present invention, suitable for use in the optical architecture 200 of the WDM PON of FIG. 2. The OLT 400 of FIG. 4 comprises substantially the same components and operates in substantially the same manner as the OLT 120 of the optical architecture 200 of FIG. 2, except that in contrast to the OLT 120 of the optical architecture 200 of FIG. 2, the OLT 400 of FIG. 4 illustratively comprises a single dual-output CW laser source implemented as the upstream and downstream multiple frequency CW laser source. More specifically, the OLT 400 of FIG. 4 illustratively comprises a dual-output upstream and downstream multiple frequency CW laser source 405, a first demultiplexer (illustratively a first arrayed waveguide grating (AWG)) 415, a first circulator 420, a second circulator 425, a first optical coupler (illustratively a 3 dB coupler) 427, a switch unit 430 comprising a switch 432 and a second optical coupler 434, and a plurality of transceivers 440 N times. Each of the transceivers 440 of the OLT 400 illustratively comprises a transmitter portion comprising a reflective modulating semiconductor optical amplifier (SOA) 442 and a driver 444, and a receiver portion comprising a photodiode 446 and a trans-impedance amplifier (TIA) 448.

In the OLT 400 of FIG. 4 it may be necessary to alternate the state of polarization between successively generated wavelengths in order to separate the wavelengths into appropriate groups for upstream or downstream transmission. As such a polarization beam splitter (not shown) in the dual-output multiple frequency CW laser source 405 may separate the wavelengths having different polarization states (i.e., a polarization beam splitter may separate TM wavelengths from TE wavelengths) and forward each group of wavelengths to the respective circulators. As previously mentioned, the remaining functions of the OLT 400 of FIG. 4 are substantially the same as described above with respect to the OLT 120 of the optical architecture 200 of FIG. 2.

Figure 5:
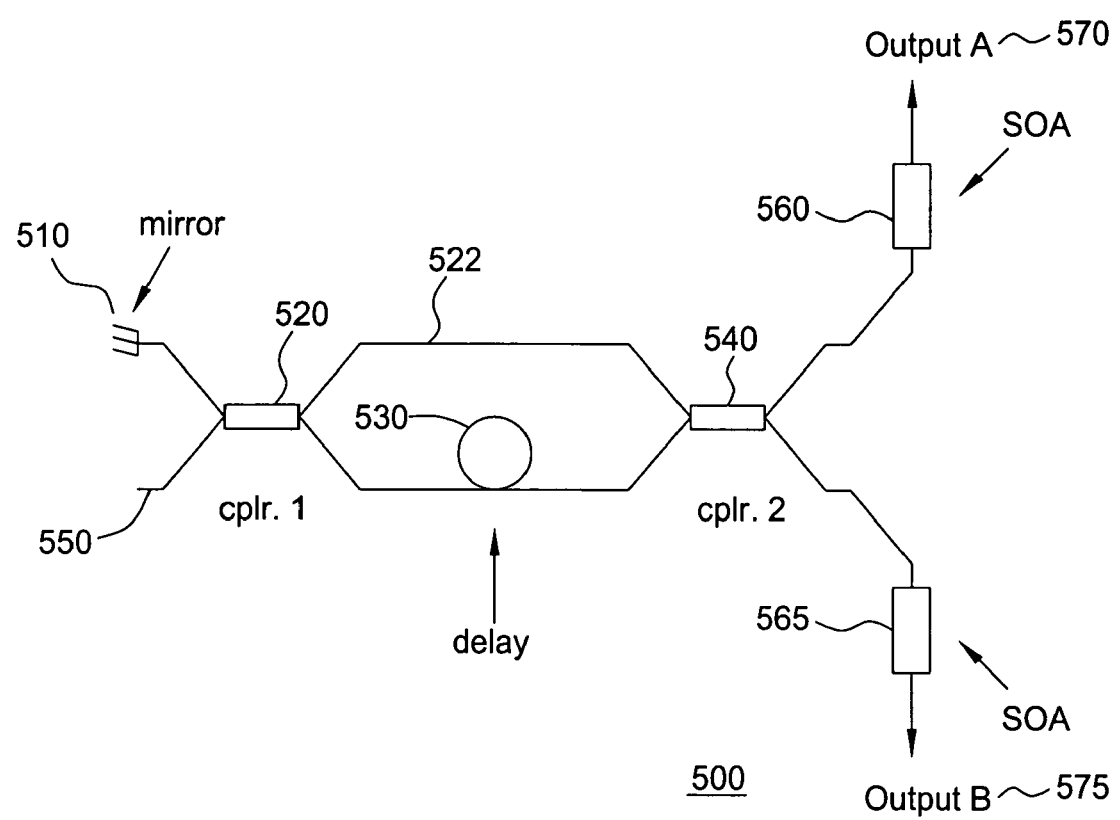
FIG. 5 depicts a high level block diagram of an embodiment of a dual-output multiple frequency CW laser source suitable for use as the upstream and downstream multiple frequency CW laser source of the OLT of FIG. 4.

FIG. 5 depicts a high level block diagram of an embodiment of a dual-output multiple frequency CW laser source suitable for use as the upstream and downstream multiple frequency CW laser source 405 of the OLT 400 of FIG. 4. The dual-output multiple frequency CW laser 500 of FIG. 5 illustratively comprises a reflective device (illustratively a mirror) 510, a first optical coupler 520, two optical paths, 522, 524, an optical delay device 530, a second optical coupler 540, a first output 550, and a second and a third output 570, 575 each having a respective SOA 560, 565. The operation of the dual-output multiple frequency CW laser 500 of FIG. 5 is substantially the same operation as the operation of the single-output multiple frequency CW laser 300 of FIG. 3 with the exception that in the dual-output multiple frequency CW laser 500 of FIG. 5 there are two SOAs and a single mirror instead of two mirrors and a single SOA. The impact is that now two outputs are available because of the phase difference between the outputs of the second optical coupler 540 (i.e., 90 degrees), the constructive interfering wavelengths appearing at the second output 575 and the destructively interfering wavelengths appearing at the third output 575. The first output port 550 contains all of the wavelengths and may be used for monitoring purposes.

In the dual-output multiple frequency CW laser 500, if the equivalent of the delay is equal to L meters, by taking into account the phase velocity in waveguides, then the generated frequencies in the first output 570 and the second output 575 may be characterized according to equations two (2) and three (3), respectively, which follow:

$$f = (m+1/2)\frac{c}{L} \qquad (2)$$

$$f = m\frac{c}{L}, \qquad (3)$$

where m depicts an integer indicating the mode or frequency index and c depicts the speed of light in free space.

In one example, for a length L=3 mm (with respect to a vacuum), the first output 570 and the second output 575 of the dual-output multiple frequency CW laser 500 each exhibit a 100 GHz spaced frequency comb spectrum with a 50 GHz shift between the two spectra. In various embodiments of the present invention, the facets of the SOAs 560, 565 where light is coupled into, for example a pigtailed fiber, are adapted to be at least partially reflective to ensure the proper operation of the laser 500.

Figure 6:
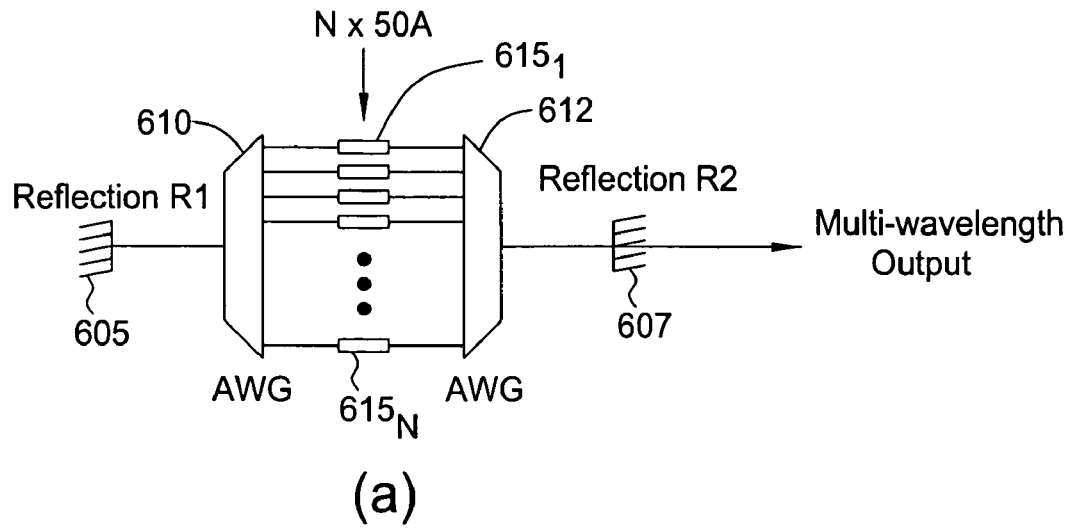
FIGS. 6a, 6b, and 6c depict alternate embodiments of multiple frequency CW laser sources suitable for use in a protocol and line-rate transparent WDM PON in accordance with the present invention.
Figure 6:
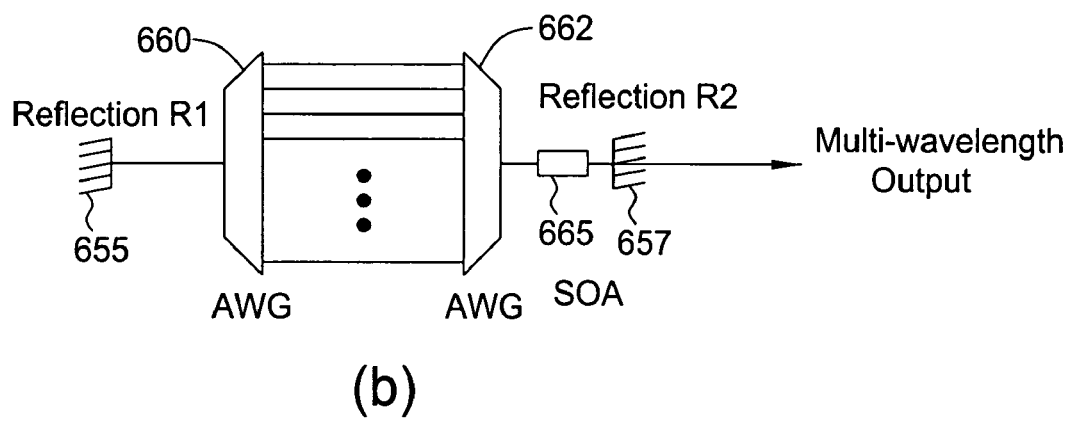
Figure 6:
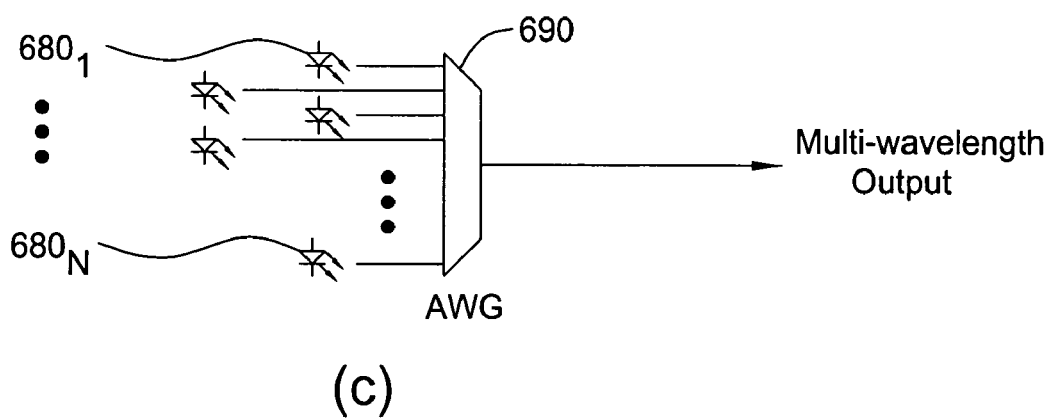

Although FIG. 3 and FIG. 5 depict specific embodiments of SOA-based multiple frequency CW laser sources suitable for use as the upstream and downstream multiple frequency CW laser sources in accordance with the present invention, other known prior-art multiple frequency CW laser sources may be implemented in place of the multiple frequency CW laser sources of FIG. 3 and FIG. 5. For example, FIGS. 6a, 6b, and 6c depict alternate embodiments of multiple frequency CW laser sources suitable for use in a protocol and line-rate transparent WDM PON in accordance with the present invention. The multiple frequency CW laser source 600 of FIG. 6a illustratively comprises a first reflective surface (illustratively a first mirror) 605, a second partial reflective surface (illustratively a second mirror) 607, a first AWG 610, a second AWG 612, a plurality of SOAs $615_1$-$615_N$ interposed between the two AWGs 610, 612. The multiple frequency CW laser source 650 of FIG. 6b illustratively comprises substantially the same components as the multiple frequency CW laser source 600 of FIG. 6a with the exception of the plurality of SOAs. That is, the multiple frequency CW laser source of FIG. 6b illustratively comprises a first reflective surface (illustratively a first mirror) 655, a second reflective surface (illustratively a second mirror) 657, a first AWG 660 and a second AWG 662. The multiple frequency CW laser source of FIG. 6b, however, only comprises a single SOA 665 on the output side of the second AWG 662. The multiple frequency CW laser source 675 of FIG. 6c illustratively comprises a plurality of single wavelength laser diodes $680_1$-$680_N$, and a multiplexer (illustratively an AWG) 690. The wavelengths from each of the plurality of single wavelength laser diodes $680_1$-$680_N$ are combined onto a single output path by the multiplexer 690.

Furthermore and in accordance with the present invention, the output power of a single multiple frequency CW laser source may be split to provide a wavelength source for multiple OLTs.

Figure 7:
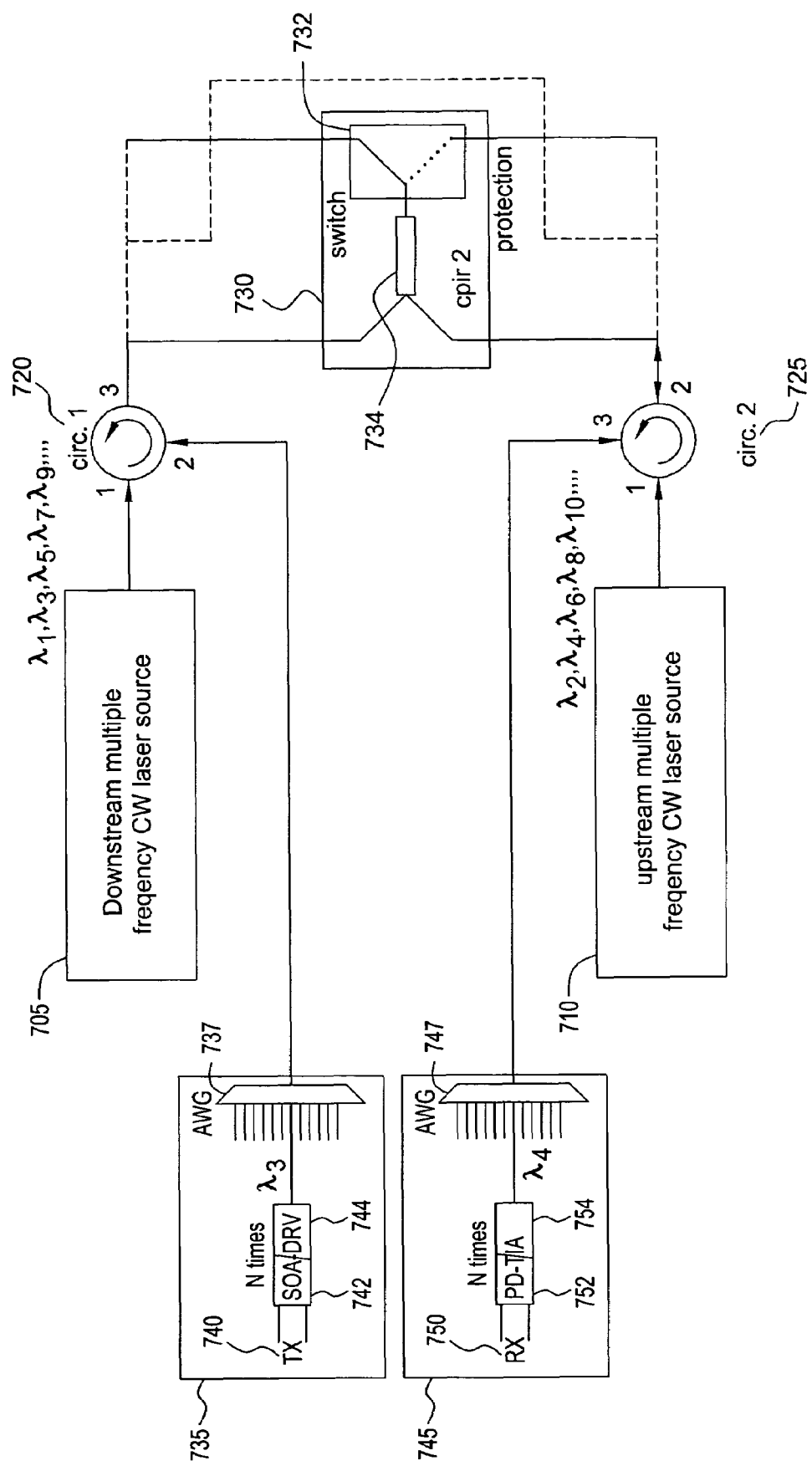
FIG. 7 depicts an alternate embodiment of an optical layer architecture of an OLT in accordance with the present invention, suitable for use in the WDM PON of FIG. 2.

FIG. 7 depicts an alternate embodiment of an optical layer of an OLT in accordance with the present invention, suitable for use in the optical architecture 200 of the WDM PON of FIG. 2. The OLT 700 of FIG. 7 comprises substantially the same components and operates in substantially the same manner as the OLT 120 of the optical architecture 200 of FIG. 2, except that in contrast to the OLT 120 of the optical architecture 200 of FIG. 2, the transmitters and receivers of the OLT are not grouped in transmitter/receiver pairs but are configured as a group of transmitters and a group of receivers. More specifically, the OLT 700 of FIG. 7 illustratively comprises a downstream multiple frequency CW laser source 705 and an upstream multiple frequency CW laser source 710, a first circulator 720, a second circulator 725, a switch unit 730 comprising a switch 732 and an optical coupler 734, a transmitter group 735 comprising a first demultiplexer (illustratively a first AWG) 737 and plurality of transmitters 740 N times and a receiver group 745 comprising a second demultiplexer (illustratively a second AWG) 747 and plurality of receivers 750 N times. Each of the transmitters 740 of the transmitter group 735 illustratively comprises a refelective modulating semiconductor optical amplifier (SOA) 742 and a driver 744. Each of the receivers 750 of the receiver group 745 illustratively comprises a photodiode 752 and a trans-impedance amplifier (TIA) 754. As previously mentioned, the operation of the OLT 700 of FIG. 7 is substantially the same as described above with respect to the OLT 120 of the optical architecture 200 of FIG. 2, except that in the OLT 700 of FIG. 7 the transmitters 740 and receivers 750 of the OLT 700 are grouped together in a transmitter group 735 and a receiver group 745, respectively.

Some of the advantages of the present invention include providing transparent synchronous connections between ONUs (users) and an OLT (provider) that supports various protocols. The use of reflective SOAs in the transmitters of the OLT and the ONUs cuts costs and eliminates the need for temperature stabilization. In addition, the present invention provides a high level of security due to optical isolation. The ONUs may have different levels of security depending on the need of the customer. Furthermore, different line rates and protocols are available for the different ONUs. This allows for a better match to the services requested by end-users and for the services provided by the service providers. There is also substantially no quality of service loss in the system of the present invention associated with loss due to a load increase caused by the addition of ONUs.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A WDM passive optical network, comprising:
   an optical line terminal for providing upstream and downstream wavelength channels, said optical line terminal including:
   at least one multiple frequency CW laser source for providing upstream and downstream wavelength channels;
   a first circulator for directing said downstream wavelength channels in an appropriate direction for downstream data transmission;
   a second circulator for directing said upstream wavelength channels in an appropriate direction for upstream data to be imparted on said upstream wavelength channels;
   a demultiplexer for separating and directing said downstream wavelength channels to a plurality of reflective modulators for modulating respective downstream wavelength channels to impart downstream data thereto;
   wherein said upstream wavelength channels and said modulated downstream wavelength channels are propagated in a downstream direction toward a respective optical network unit, and wherein distinct upstream and downstream wavelength channels are provided for each optical network unit of said WDM passive optical network;
   an optical feeder network including a single passive optical demultiplexer for directing each of said upstream and downstream wavelength channels to a respective intended optical network unit; and
   a plurality of optical network units, each of said optical network units including a receiver for receiving a respective downstream wavelength channel and a reflective modulator for modulating a respective upstream wavelength channel to impart upstream data thereto and for propagating said modulated upstream wavelength channels in an upstream direction toward a respective upstream receiver;
   wherein states of polarization between successively generated wavelength channels are alternated and said at least one multiple frequency CW laser source comprises a dual-output multiple frequency CW laser source and a polarization beam splitter to separate the wavelengths having different polarization states to be used for upstream and downstream wavelength channels.

2. The WDM passive optical network of claim 1, wherein said reflective modulators comprise reflective modulating semiconductor optical amplifiers.

3. The WDM passive optical network of claim 1, further comprising respective modulator drivers for driving said reflective modulators.

4. The WDM passive optical network of claim 1, where said optical line terminal further comprises respective receivers for receiving said modulated upstream wavelength channels from respective optical network units.

5. The WDM passive optical network of claim 4, wherein said receivers of said optical line terminal and said optical network units each comprises:
   an electro-optic detector; and
   a current-to-voltage amplifier.

6. The WDM passive optical network of claim 5, wherein said electro-optic detectors comprise photodiodes and said current-to-voltage amplifiers comprise trans-impedance amplifiers.

7. The WDM passive optical network of claim 1, wherein said optical line terminal further comprises:
   an optical switch unit for directing said upstream and downstream wavelength channels along a predetermined path.

8. The WDM passive optical network of claim 7, wherein said at least one multiple frequency CW laser source comprises an SOA-based dual-output multiple frequency CW laser source.

9. The WDM passive optical network of claim 1, wherein said optical feeder network further comprises a protection ring including two optical paths for directing said upstream and said downstream wavelength channels in a clockwise or counter-clockwise direction.

10. The WDM passive optical network of claim 1, wherein said optical line terminal is the only source of said upstream and downstream wavelength channels.

11. A WDM passive optical network, comprising:
    an optical line terminal comprising at least one multiple frequency CW laser source for providing upstream and downstream wavelength channels, and a plurality of reflective modulators for modulating respective downstream wavelength channels to impart downstream data thereto, wherein said upstream wavelength channels and said modulated downstream wavelength channels are propagated in a downstream direction toward a respective optical network unit, and wherein distinct upstream and downstream wavelength channels are provided for each optical network unit of said WDM passive optical network, said optical line terminal further comprises:
    a first circulator for receiving said downstream wavelength channels and directing said downstream wavelength channels in an appropriate direction for downstream data transmission;
    a second circulator for receiving said upstream wavelength channels and directing said upstream wavelength channels in an appropriate direction for upstream data to be imparted on said upstream wavelength channels;
    at least one demultiplexer for separating said upstream and downstream wavelength channels and directing each of the wavelength channels to respective ones of said optical network units; and an optical switch unit for directing said upstream and downstream wavelength channels along a predetermined path;

an optical feeder network including a passive optical demultiplexer for directing each of said upstream and downstream wavelength channels to a respective intended optical network unit; and a plurality of optical network units, each of said optical network units including a receiver for receiving a respective downstream wavelength channel and a reflective modulator for modulating a respective upstream wavelength channel to impart upstream data thereto and for propagating said modulated upstream wavelength channels in an upstream direction toward a respective upstream receiver;

wherein states of polarization between successively generated wavelength channels are alternated and said at least one multiple frequency CW laser source comprises a dual-output multiple frequency CW laser source and a polarization beam splitter to separate the wavelengths having different polarization states to be used for upstream and downstream wavelength channels.

12. The WDM passive optical network of claim 11, wherein said reflective modulator comprises a reflective modulating semiconductor optical amplifier.

13. The WDM passive optical network of claim 11, wherein said optical feeder network further comprises a protection ring including two optical paths for directing said upstream and said downstream wavelength channels in a clockwise or counter-clockwise direction.

* * * * *